US012559180B2

(12) United States Patent
Hayashi et al.

(10) Patent No.: US 12,559,180 B2
(45) Date of Patent: Feb. 24, 2026

(54) VEHICLE OUTER PANEL ASSEMBLY

(71) Applicant: TOYOTA JIDOSHA KABUSHIKI KAISHA, Aichi-ken (JP)

(72) Inventors: Takanori Hayashi, Toyota (JP); Atsushi Iwasaki, Nagakute (JP); Yurika Sawada, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 465 days.

(21) Appl. No.: 18/301,996

(22) Filed: Apr. 18, 2023

(65) Prior Publication Data

US 2023/0331312 A1 Oct. 19, 2023

(30) Foreign Application Priority Data

Apr. 19, 2022 (JP) ................................. 2022-068585

(51) Int. Cl.
B62D 25/16 (2006.01)
(52) U.S. Cl.
CPC .................................. B62D 25/163 (2013.01)
(58) Field of Classification Search
CPC ...... B62D 25/16; B62D 25/163; B62D 25/18; B62D 25/24; B62D 25/02; B62D 27/023

USPC ......... 296/191, 198, 29, 30; 280/154, 153.5, 280/853, 854
See application file for complete search history.

(56) References Cited

U.S. PATENT DOCUMENTS

2019/0126991 A1 * 5/2019 Wymore ................ B62D 25/16

FOREIGN PATENT DOCUMENTS

JP        5715708 B2       5/2015
JP        2019-111977 A    7/2019
KR        20010113099 A  * 12/2001 ............. B62D 25/04
KR        20220056477 A  *  5/2022 ........... B62D 25/081

* cited by examiner

*Primary Examiner* — Amy R Weisberg
*Assistant Examiner* — Wenwei Zhuo
(74) *Attorney, Agent, or Firm* — HAUPTMAN HAM, LLP

(57) ABSTRACT

Decrease in rigidity of an outer panel around its opening is suppressed. A vehicle outer panel assembly includes a fender panel lower part, which is an outer panel for a vehicle, and a bracket that reinforces the fender panel lower part. The fender panel lower part is perforated in a part thereof and thereby includes a frame part formed therein. The frame part includes a narrow rear crosspiece formed at an end edge of the fender panel lower part. The bracket is overlapped on and secured to the rear crosspiece.

2 Claims, 6 Drawing Sheets

71
72
71A
71B
71C
73
73A
74
74A
75
75A
70

UP
FR    RW

VEHICLE OUTER PANEL ASSEMBLY

CROSS REFERENCE TO RELATED APPLICATION

This application claims priority to Japanese Patent Application No. 2022-068585 filed on Apr. 19, 2022, which is incorporated herein by reference in its entirety including the specification, claims, drawings, and abstract.

TECHNICAL FIELD

The present specification discloses an outer panel assembly formed by assembling a plurality of components.

BACKGROUND

An outer panel of a vehicle is formed to have an opening in a part thereof for disposing an oil filler port or a charging inlet. For example, in JP 5715708 B, an opening is provided in a front fender panel of an electric vehicle (BEV), and a charging unit is fitted into this opening.

In cases where an opening is provided in an outer panel, a reduction in rigidity of the outer panel around the opening may result, depending on the manner in which the opening is provided. In view of this, the present specification discloses an outer panel assembly which can suppress such a reduction in rigidity of the outer panel around the opening.

SUMMARY

The present specification discloses a vehicle outer panel assembly. This assembly includes an outer panel for a vehicle, and a bracket that reinforces the outer panel. The outer panel is perforated in a part thereof and thereby includes a frame part formed therein. The frame part includes a narrow crosspiece formed at an end edge of the outer panel. The bracket is overlapped on and secured to the crosspiece.

According to the above configuration, since the narrow crosspiece, which is relatively less rigid, is reinforced by the bracket, rigidity around the frame part can be improved.

Further, in the above configuration, the crosspiece may be partially cut out. In that case, segments of the crosspiece located facing each other across a cut-out part are connected to each other by the bracket.

According to the above configuration, in cases where a cut-out part must be provided in the crosspiece, reduction in rigidity can be avoided by connecting the segments of the crosspiece located on both sides of the cut-out part to each other with the bracket.

Further, in the above configuration, the outer panel may include a fender panel lower part, which is a lower part of a divided member obtained by dividing a fender panel into two parts; namely, upper and lower parts. In that case, the frame part is formed in an upper end portion of the fender panel lower part. On a lower end portion of a fender panel upper part, which is the upper part of the divided member, a protruding segment is formed, which is overlapped on the crosspiece of the frame part. Three members; namely, the crosspiece of the fender panel lower part, the protruding segment of the fender panel upper part, and the bracket, are overlapped and secured together.

According to the above configuration, since the fender panel lower part and the fender panel upper part are overlapped with the bracket and secured together, deformation (e.g., bending deformation) at the secured portion can be suppressed, thereby suppressing breakage at the secured portion.

According to the vehicle outer panel assembly disclosed in the present specification, reduction in rigidity around the opening in the outer panel can be suppressed.

BRIEF DESCRIPTION OF DRAWINGS

Embodiment(s) of the present disclosure will be described based on the following figures, wherein.

DESCRIPTION OF EMBODIMENTS

A vehicle outer panel assembly according to an embodiment will now be described by reference to the drawings. The shapes, materials, numbers of components, and numerical values described below are referred to simply by way of example, and can be changed as appropriate in accordance with specifications of the assembly. Further, in the following description, identical elements in all of the drawings are assigned the same reference signs.

In FIGS. 1 to 6, in order to indicate positions and directions of structures, a rectangular coordinate system composed of a FR axis, a RW axis, and a UP axis is used. The FR axis is a vehicle longitudinal direction axis on which the vehicle front direction is the positive direction. The RW axis is a vehicle width direction axis on which the vehicle right direction is the positive direction. The UP axis is a vehicle vertical direction axis on which the vehicle upward direction is the positive direction.

Figure 1:
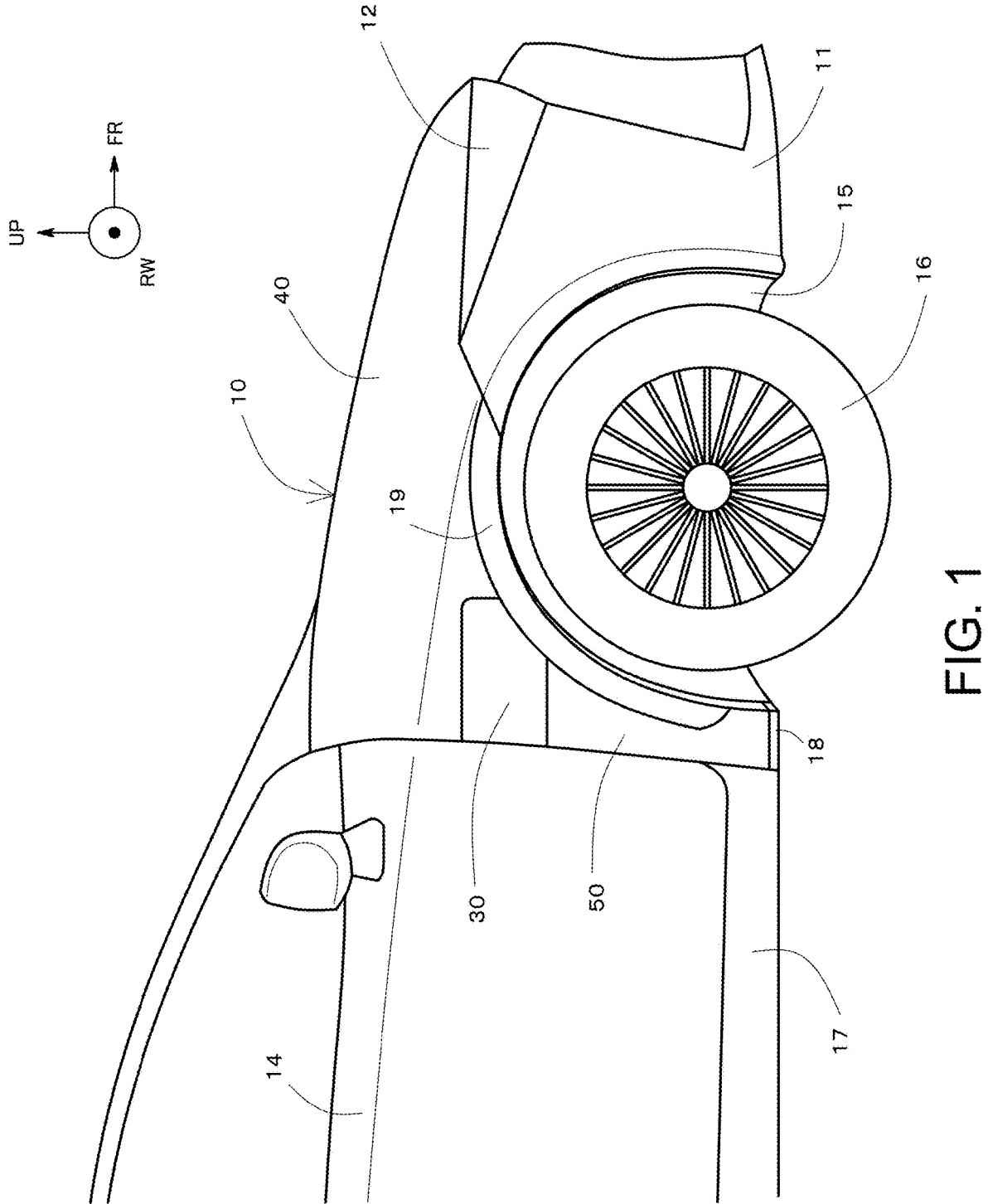
FIG. 1 is a side view showing, by way of example, a vehicle having a front fender which is an outer panel assembly according to an embodiment.
Figure 6:
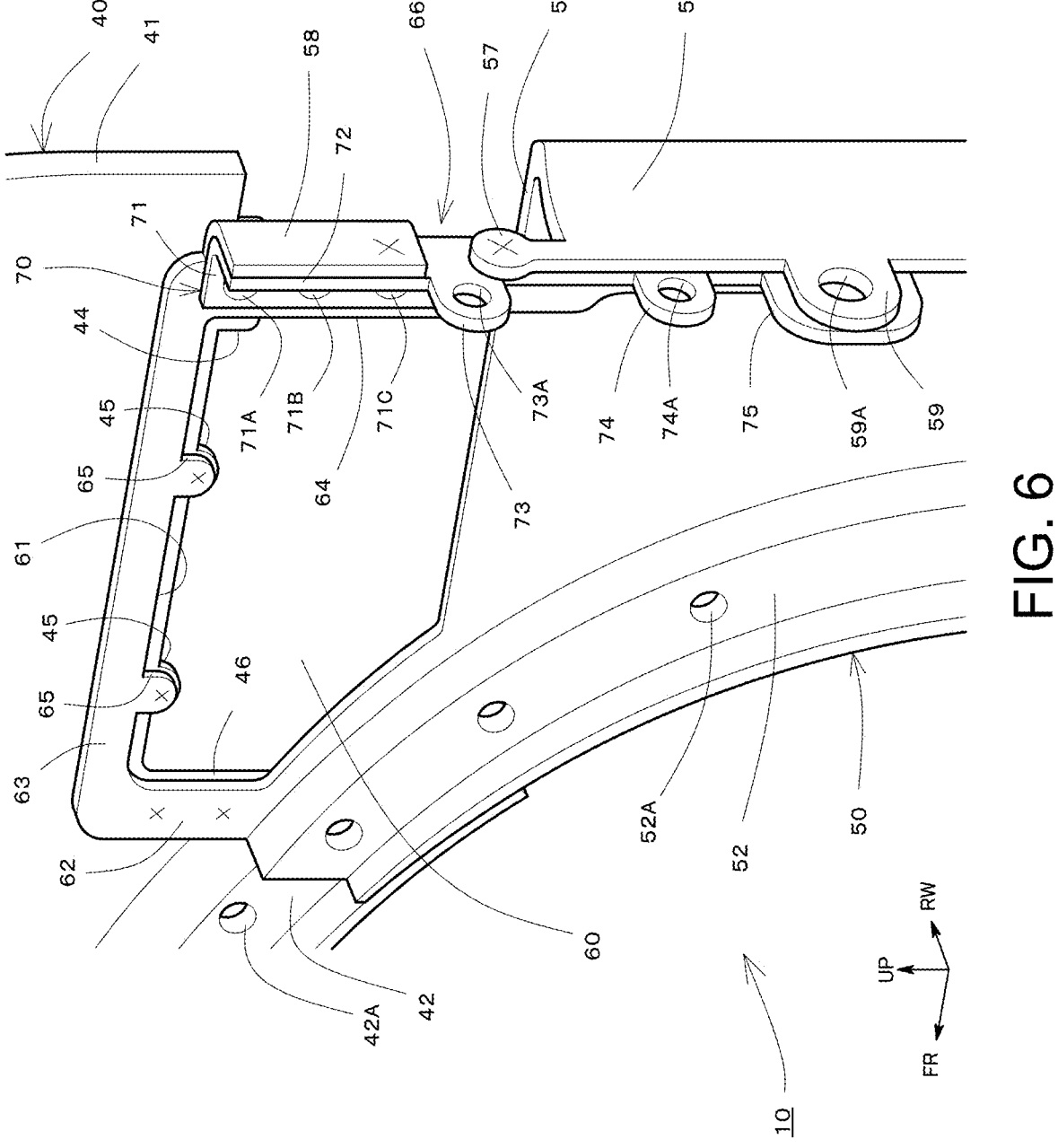
FIG. 6 is a perspective view for explaining the front fender assembling structure.

Referring to FIG. 1, the vehicle outer panel assembly according to the present embodiment is composed by including, for example, a front fender panel 10 and a bracket 70 (see FIG. 6). The front fender panel 10 is a panel member that covers a front side face of a vehicle.

As will be described later, the front fender panel 10 is divided into two parts; namely, upper and lower parts. That is, the front fender panel 10 comprises a fender panel upper part 40 as an upper part of the divided member. Further, the front fender panel 10 comprises a fender panel lower part 50 as a lower part of the divided member. The detailed structure of these parts will be described later.

The front fender panel 10 is located in front of a front door 14 and a rocker panel molding 17, and behind a headlamp 12 and a front bumper 11.

The front fender panel 10 includes an arcuate portion located along a front tire 16, and flanges 42, 52 (see FIG. 3) are provided at this arcuate portion. A front fender molding 19 (see FIG. 1) and a front fender liner 15, which are members for protection against mud and pebbles, are fastened to the flanges 42, 52.

Figure 2:
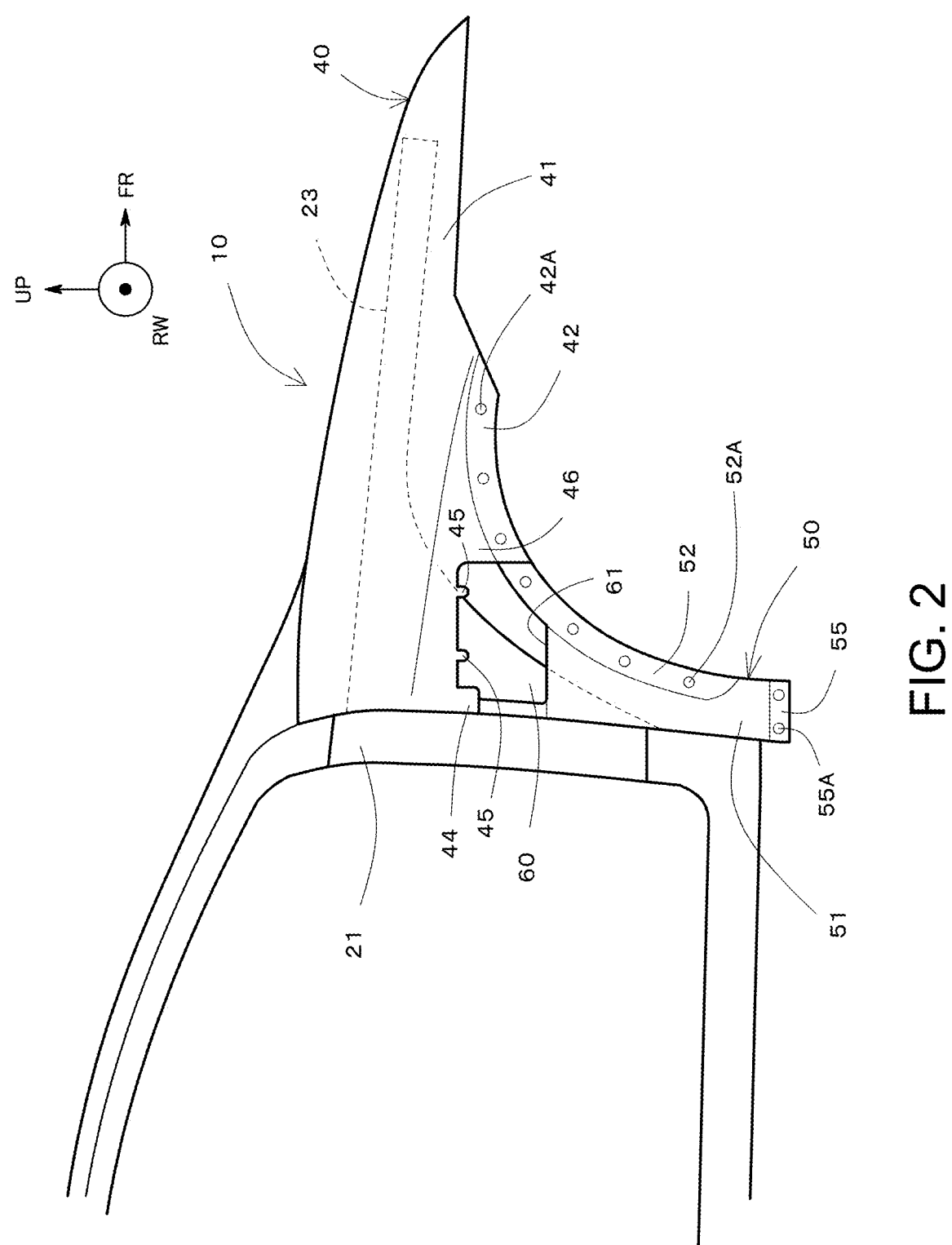
FIG. 2 is a side view showing, by way of example, the front fender, which is the outer panel assembly according to the embodiment, and a skeletal structure of the vehicle.

Referring to FIG. 2, the front fender panel 10 is fastened to and supported on a skeletal member of the vehicle. For example, an inward portion, in the vehicle width direction, of the front fender panel 10 is fastened to an apron upper member 23. A front end portion of the apron upper member 23 is connected to a radiator support (not shown in drawing). Further, a rear end portion of the front fender panel 10 is fastened to a front pillar lower part 21.

Referring to FIG. 1, a lid 30, which is a cover member, is provided in the front fender panel 10. For example, when an internal combustion engine is included in the drive source of the vehicle, the lid 30 is a fuel lid that opens and closes a fuel box having an oil filler port. When the vehicle is a fuel cell vehicle (FCEV), the lid 30 is a fuel lid that opens and closes a fuel box having an inlet for hydrogen fuel. Further, when the vehicle is an electric vehicle (BEV) or a plug-in hybrid vehicle (PHEV) which is externally chargeable, the lid 30 is an inlet lid that opens and closes an inlet box having a charge inlet.

For example, when viewed from a side face, the front fender panel 10 has a substantially triangular shape having a vertical size that increases from the front toward the rear. In consideration of such a structure, the lid 30 is provided in, for example, a rear portion of the front fender panel 10 where the size allows relatively more room.

Referring to FIG. 2, in providing the lid 30 and the fuel box or inlet box in the front fender panel 10, a box opening 60 is formed in the front fender panel 10 by perforating a part thereof. For example, as shown by way of example in FIG. 4, the box opening 60 is provided in an upper end portion of the fender panel lower part 50. The detailed structure of the box opening 60 will be described later.

<Fender Panel Upper Part>

Figure 3:
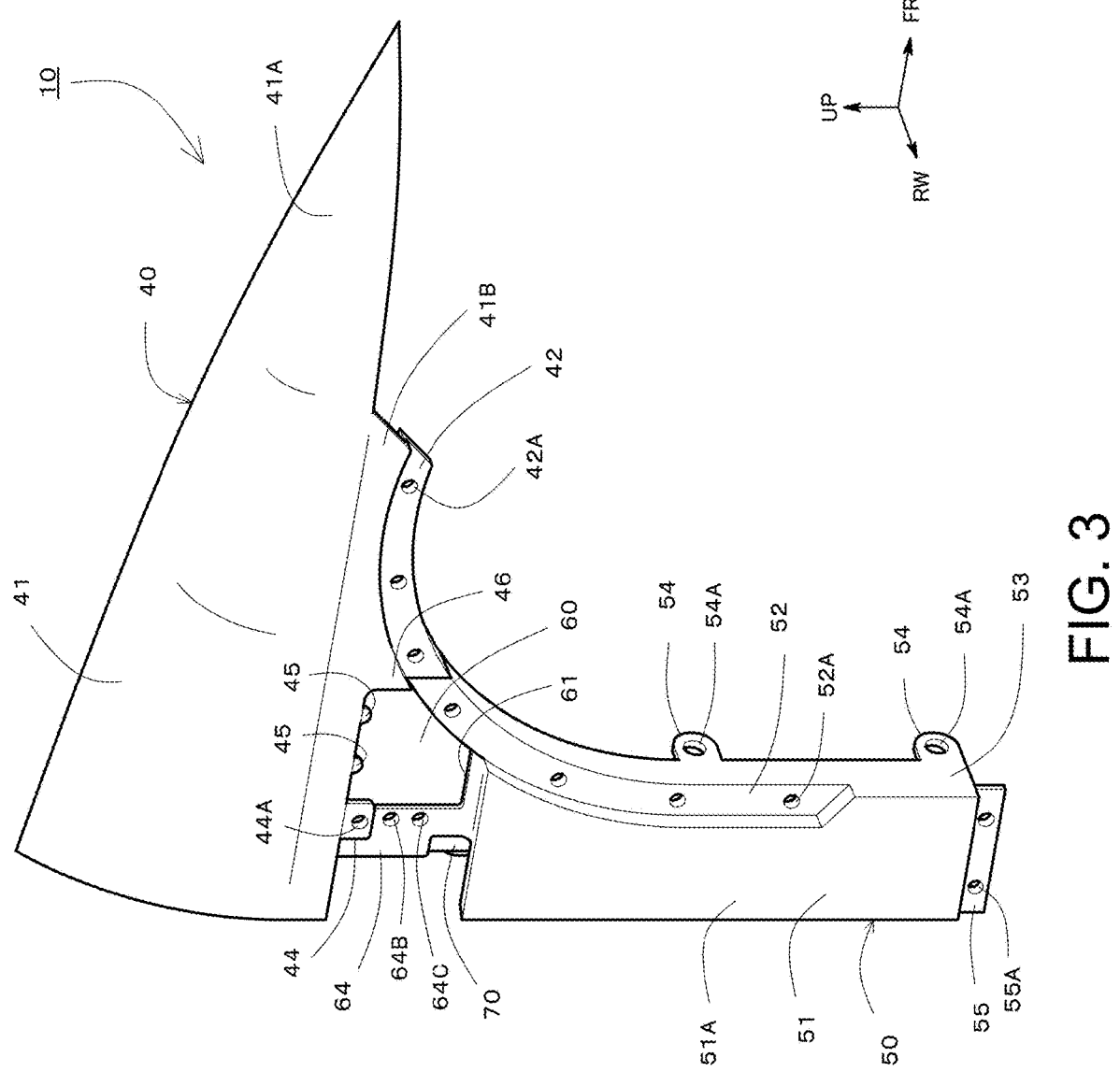
FIG. 3 is a perspective view showing the front fender by way of example.
Figure 4:
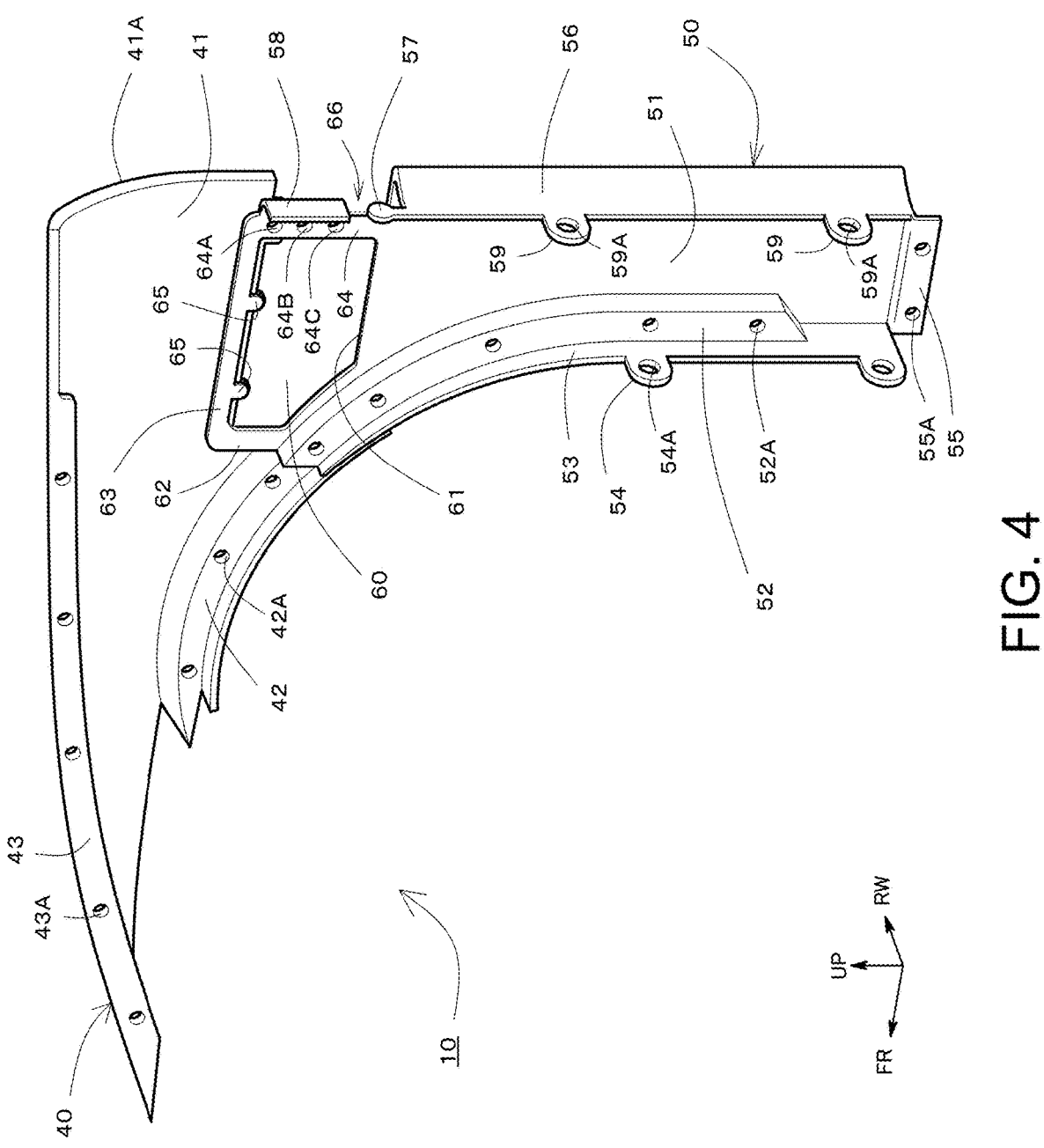
FIG. 4 is a perspective view of the front fender as seen from a direction opposite that of FIG. 3.

FIG. 3 shows, by way of example, a perspective view of the front fender panel 10 alone, which is one part of the outer panel assembly according to the present embodiment. As a vehicle outer panel, the front fender panel 10 comprises the fender panel upper part 40, which is an upper part of a divided member, and the fender panel lower part 50, which is a lower part of the divided member. The outer panel assembly according to the present embodiment further comprises the bracket 70 (see FIG. 6), which is located at a connecting portion between the fender panel upper part 40 and the fender panel lower part 50, and which reinforces those two parts. In FIGS. 3 and 4, illustration of the bracket 70 is omitted for the purpose of clearly showing, among others, an overlap between portions of the fender panel upper part 40 and the fender panel lower part 50.

The fender panel upper part 40 is composed of, for example, a resin, a sheet metal such as an aluminum panel, or the like. The fender panel upper part 40 comprises a main body portion 41 and flanges 42, 43. The main body portion 41 includes a curved design surface 41A, and a substantially planar design surface 41B constituting a part of a side face of the vehicle.

The flange 42 is provided at a lower end of the design surface 41B, and has an arcuate shape along the shape of the front tire 16 (see FIG. 1). The fender panel upper part is shaped such that the flange 42 is recessed in the vehicle width direction from the design surface 41B. The flange 42 is perforated in its thickness direction with a plurality of fastening holes 42A. Into these fastening holes 42A, clips (not shown in drawing) of the front fender molding 19 (see FIG. 1) are inserted. Further, referring to FIG. 4, a rear end portion of the flange 42 is overlapped on an upper end portion of a flange 52 of the fender panel lower part 50.

Referring to FIG. 4, the flange 43 is provided at an upper end of the design surface 41A. The flange 43 is shaped so as to face inward in the vehicle width direction. The flange 43 is perforated in its thickness direction with a plurality of fastening holes 43A. These fastening holes 43A are aligned with fastening holes (not shown in drawing) in the apron upper member 23 (see FIG. 2), and fastening members such as clips are inserted into these holes, whereby the fender panel upper part 40 is fastened to the apron upper member 23.

A rear lower-end portion of the main body part 41 is overlapped on an upper portion of a frame part 61 of the box opening 60. More specifically, referring to FIG. 6, an upper crosspiece 63 constituting a part of the frame structure of the frame part 61 is overlapped with the lower end portion of the main body part 41. Further, on the rear lower-end portion of the main body part 41, protruding segments 45, 45 protruding into the box opening 60 are provided. In addition, protruding segments 65, 65 protruding into the box opening 60 are provided on the upper crosspiece 63 of the frame part 61 as well.

The protruding segments 45, 45 of the fender panel upper part 40 and the protruding segments 65, 65 of the frame part 61 are overlapped, and each pair of protruding segment and protruding segment 65 is welded together as shown by an X mark in the drawing. By thus having the upper crosspiece 63 and the lower end portion of the fender panel upper part 40 overlapped and welded together, the upper crosspiece 63 is reinforced.

Further, referring to FIGS. 2 and 3, at a portion of the fender panel upper part 40 located toward the front of the box opening 60, a projecting portion 46 extending toward the flange 42 is provided. Referring to FIG. 6, the projecting portion 46 is overlapped on a front crosspiece 62 of the frame part 61, and these two parts are welded together as shown by X marks in the drawing. The front crosspiece 62 is thereby reinforced.

Furthermore, referring to FIG. 3, at a lower end portion of the fender panel upper part 40, a protruding segment 44 is provided to overlap a rear crosspiece 64 of the frame part 61. The protruding segment 44 is perforated in its thickness direction with a fastening hole 44A. Referring to FIG. 6, the protruding segment 44, the rear crosspiece 64 of the frame part 61, and the bracket 70 are overlapped, and these three parts are secured together by fastening with fastening members such as a bolt and a nut. The rear crosspiece 64 is thereby reinforced. From a different viewpoint, it can be said that the protruding segment 44 and the rear crosspiece 64 are reinforced by the bracket 70. Here, instead of fastening with a bolt and a nut, the protruding segment 44, the rear crosspiece 64, and the bracket 70 may be secured to each other by welding such as spot welding. The details of this reinforcing structure will be described later.

<Fender Panel Lower Part>

Referring to FIGS. 3 and 4, the fender panel lower part 50 comprises a main body portion 51 and flanges 52, 53, 55, 56. The main body portion 51 includes a design surface 51A. The fender panel upper part 40 and the fender panel lower part 50 are assembled to a vehicle body such that the design surface 51A and the design surface 41B of the fender panel upper part 40 are arranged in the same plane.

The fender panel lower part 50 is shaped such that the flange 52 is recessed in the vehicle width direction from the design surface 51A. The flange 52 is connected to the flange 42 of the fender panel upper part 40 and formed in an arcuate shape. As with the flange 42, the flange 52 is perforated in its thickness direction with a plurality of fastening holes 52A. Into these fastening holes 52A, clips (not shown in drawing) of the front fender molding 19 (see FIG. 1) are inserted.

At a front end portion of the flange 52, the flange 53 is provided, which is perpendicular in cross section to the flange 52. On the flange 53, protruding segments 54 protruding in the vehicle width direction are provided. The protruding segments 54 are perforated in the thickness direction with fastening holes 54A. Into these fastening holes 54A, clips (not shown in drawing) of the front fender liner 15 (see FIG. 1) are inserted.

At a lower end of the main body portion 51, the flange 55 is provided. The fender panel lower part 50 is shaped such that the flange 55 is recessed in the vehicle width direction from the main body portion 51. The flange 55 is perforated in its thickness direction with fastening holes 55A. Into the fastening holes 55A, clips (not shown in drawing) of a mudguard 18 (see FIG. 1) are inserted.

The fender panel lower part 50 is perforated in a part of an upper end portion thereof and thereby includes the frame part 61 formed therein. For example, as shown by way of example in FIG. 4, an upper part of the main body portion 51 is perforated, and the box opening 60 is thereby formed. The frame part 61 of the box opening 60 is substantially rectangular, and comprises the front crosspiece 62, the upper crosspiece 63, and the rear crosspiece 64, which are formed at end edges of the fender panel lower part 50, and all of which have a narrow width.

As described above, the front crosspiece 62 (see FIG. 6) is reinforced by being overlapped and welded together with the projecting portion 46 of the fender panel upper part 40. The upper crosspiece 63 is reinforced by being overlapped with the lower end portion of the main body portion 41 of the fender panel upper part 40 and having the protruding segments 45, 65 welded together. Further, the rear crosspiece 64 is reinforced by being overlapped and secured together with the bracket 70.

Referring to FIG. 4, the flange 56 is provided at a rear end of the main body portion 51. The flange 56 is formed by being bent from the main body portion 51. For example, referring to FIG. 6, the flange 56 is formed to have a surface shape that is slightly curved with respect to the UP-RW plane.

The flange 56 is secured to the front pillar lower part 21 (see FIG. 2) via protruding segments 59. The front pillar lower part 21 also supports the front door 14 (see FIG. 1) via a hinge mechanism (not shown in drawing). In order to avoid interference with a swing path of a front end portion of the front door 14, the flange 56, which is located facing the front end portion of the front door 14, has a surface shape that is curved with respect to the UP-RW plane.

An upper end of the flange 56 extends to the frame part 61. Further, from this upper end, a protruding segment 57 extends upward. For example, the protruding segment 57 is shaped to be planar. At a position located above the protruding segment 57 across a cut-out part 66, a flange 58 is provided. This flange 58 is a part of the rear crosspiece 64, and a lower portion of the rear crosspiece 64 is absent due to the cut-out part 66.

That is, a part of the rear crosspiece 64 is cut out, and the protruding segment 57 and the flange 58 are provided as segments facing each other across this cut-out part 66. As will be described later, the protruding segment 57 and the flange 58 are connected to each other with the bracket 70. The rear crosspiece 64 is thereby reinforced.

In welding the flange 58 and the bracket 70 together (as shown by an X mark in FIG. 6), the flange 58 is required to have a planar shape. On the other hand, as described above, in order to avoid interference with the swing path of the front door 14, the flange 56 is required to have a curved surface shape. In order to satisfy both of these shape requirements, the flanges 56, 58 are detached from each other by the cut-off part 66. Further, by connecting the flanges 56, 58 via the bracket 70, the rear crosspiece 64 of the frame part 61 is reinforced.

<Bracket>

Figure 5:
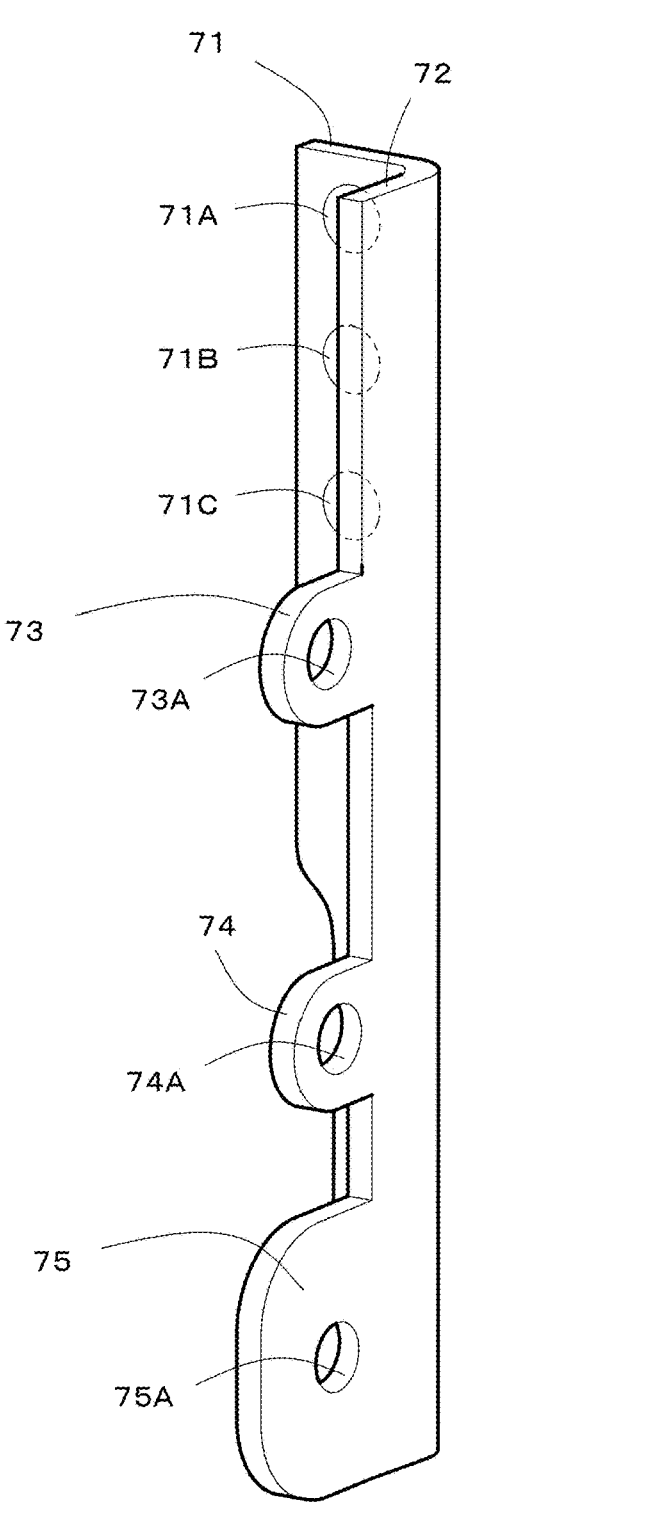
FIG. 5 is a perspective view showing a bracket by way of example.
Figure 5:
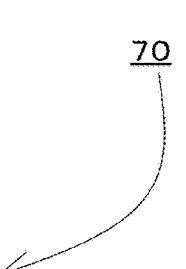
Figure 5:
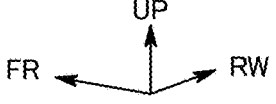

FIG. 5 is a perspective view showing the bracket 70 alone by way of example. The bracket 70 is a member having an L-shaped cross section, and comprises a support segment 71 and a support segment 72 that is bent substantially perpendicularly from the support segment 71. An upper portion of the support segment 71 is perforated in its thickness direction with fastening holes 71A, 71B, 71C. The support segment 72 has formed thereon projecting segments 73, 74, 75 projecting outward in the vehicle width direction. In the projecting segments 73, 74, 75, fastening holes 73A, 74A, 75A are formed.

Referring to FIG. 6, the support segment 71 is overlapped on the rear crosspiece 64. Further, all three of the fastening hole 71A, the fastening hole 64A (see FIG. 4) of the rear crosspiece 64 of the frame part 61, and the fastening hole 44A of the projecting segment 44 of the fender panel upper part 40 (see FIG. 3) are aligned with each other, and these parts are secured together by fastening with fastening parts such as a bolt and a nut. In addition, the fastening holes 71B, 71C of the bracket 70 (see FIG. 5) are aligned with the fastening holes 64B, 64C of the rear crosspiece 64 (see FIG. 4), and these parts are secured together by fastening with fastening members such as bolts and nuts. Here, instead of fastening with a bolt and a nut, the above-noted parts may be secured together by welding such as spot welding.

Further, referring to FIG. 6, the support segment 72 is overlapped on the flange 58 and on the projecting segment 57, and welded to these segments as shown by X marks in the drawing. Furthermore, the fastening hole 75A of the projecting segment 75 of the support segment 72 is aligned with a fastening hole 59A of the projecting segment 59 of the fender panel lower part 50. The fastening holes 73A, 74A are used for securing to the front pillar lower part 21 (see FIG. 2) by fastening with fastening members such as bolts and nuts.

OTHER EMBODIMENTS

Although in the above-described embodiment the front fender panel 10 is referred to as the outer panel assembly by way of example, the outer panel assembly according to the present disclosure is not limited to this embodiment. For example, the outer panel assembly may be a rear fender panel. In that case, the rear fender panel is similarly divided into two parts; namely, upper and lower parts.

A substantially rectangular box opening is provided in an upper end portion of a fender panel lower part, which is the lower part of the divided member. For example, the box opening is provided in an upper-end, front-end portion of the fender panel lower part, and among portions of a frame part of the box opening, a front crosspiece is the narrow crosspiece. A bracket 70 is overlapped on and secured to this front crosspiece.

The present disclosure is not limited to the present embodiments described above, and includes all changes and modifications without departing from the technical scope or the essence of the present disclosure defined by the claims.

The invention claimed is:

1. A vehicle outer panel assembly, comprising an outer panel of a vehicle and a bracket that reinforces the outer panel, wherein the outer panel is perforated in a part thereof and thereby includes a frame part formed therein, the frame part includes a narrow crosspiece formed at an end edge of the outer panel, and the bracket is overlapped on and secured to the crosspiece, wherein the outer panel includes a fender panel lower part, which is a lower part of a divided member obtained by dividing a fender panel into two parts, namely, upper and lower parts, the frame part is formed in an upper end portion of the fender panel lower part, on a lower end portion of a fender panel upper part, which is the upper part of the divided member, a protruding segment is formed, which is overlapped on the crosspiece of the frame part, and three members, namely, the crosspiece of the fender panel lower part, the protruding segment of the fender panel upper part, and the bracket are overlapped and secured together.

2. The vehicle outer panel assembly according to claim 1, wherein the crosspiece is partially cut out, and segments of the crosspiece located facing each other across a cut-out part are connected to each other by the bracket.

\* \* \* \* \*